(12) United States Patent
Yamamoto

(10) Patent No.: US 8,153,897 B2
(45) Date of Patent: Apr. 10, 2012

(54) HARNESS ROUTING STRUCTURE FOR LINK

(75) Inventor: Masataka Yamamoto, Kosai (JP)

(73) Assignee: Yazaki Corporation, Tokyo (JP)

( * ) Notice: Subject to any disclaimer, the term of this patent is extended or adjusted under 35 U.S.C. 154(b) by 757 days.

(21) Appl. No.: 12/243,219

(22) Filed: Oct. 1, 2008

(65) Prior Publication Data

US 2009/0101407 A1    Apr. 23, 2009

(30) Foreign Application Priority Data

Oct. 17, 2007  (JP) ................................. 2007-270053

(51) Int. Cl.
*H01B 7/00* (2006.01)
*H02G 11/00* (2006.01)

(52) U.S. Cl. .................. 174/72 A; 174/68.1; 174/68.3; 174/72 R; 248/68.1; 248/49

(58) Field of Classification Search .................. 174/650, 174/68.1, 68.3, 135, 72 A, 74 R, 88 R, 70 C, 174/69, 97, 99 R, 72 R, 101; 248/629, 60, 248/49, 68.1, 70, 74.2, 74.3, 73; 439/501, 439/502; 211/26; 361/826, 827
See application file for complete search history.

(56) References Cited

U.S. PATENT DOCUMENTS

| | | | |
|---|---|---|---|
| 4,939,867 A | | 7/1990 | Harada et al. |
| 6,417,452 B1 * | | 7/2002 | Doshita ........................ 174/72 A |
| 7,265,295 B2 * | | 9/2007 | Kogure et al. ............... 174/72 A |
| 7,390,968 B2 * | | 6/2008 | Kogure et al. ............... 174/72 A |
| 7,683,259 B2 * | | 3/2010 | Tsubaki et al. .............. 174/72 A |
| 7,729,132 B2 * | | 6/2010 | Yamamoto et al. .......... 174/72 A |
| 7,854,413 B2 * | | 12/2010 | Yamamoto et al. .......... 174/72 A |
| 7,905,537 B2 * | | 3/2011 | Sato et al. .................... 174/101 |
| 7,910,832 B2 * | | 3/2011 | Pieh et al. .................... 174/68.3 |
| 7,939,760 B2 * | | 5/2011 | Iwahara ...................... 174/72 A |
| 2007/0148994 A1 | | 6/2007 | Sato et al. |

FOREIGN PATENT DOCUMENTS

| | | |
|---|---|---|
| DE | 102 04 597 A1 | 8/2003 |
| JP | 5-26664 U | 4/1993 |
| JP | 2001-151042 A | 6/2001 |
| JP | 2001-260770 A | 9/2001 |
| JP | 2006-42566 A | 2/2006 |
| JP | 2006-117054 A | 5/2006 |
| JP | 2007-76623 A | 3/2007 |

OTHER PUBLICATIONS

Chinese Office Action issued on Dec. 9, 2010 in the corresponding Chinese Patent Application No. 200810167283.3.
Extended European Search Report issued Sep. 9, 2011 in corresponding European Patent Application No. 08018075.5.

* cited by examiner

*Primary Examiner* — Angel R Estrada
(74) *Attorney, Agent, or Firm* — Sughrue Mion, PLLC

(57) ABSTRACT

A harness routing structure includes: a supporting portion; a link pivotally supported by the supporting portion; and a harness protector provided on the supporting portion. The harness protector includes a harness guide portion for guiding to lead a wire harness thereto, a harness guide path, successive to the harness guide portion, along which the wire harness is routed, and a harness accommodating portion, successive to the harness guide path, for accommodating the wire harness bendably. The wire harness is led from the link to the harness protector to be routed in the harness protector. An excess length of the wire harness is absorbed into the harness accommodating portion in conjunction with rotation of the link.

6 Claims, 3 Drawing Sheets

HARNESS ROUTING STRUCTURE FOR LINK

BACKGROUND OF THE INVENTION

1. Technical Field

The present invention relates to a harness routing structure for a link for routing a wire harness for power feeding along a rotary type link from a harness protector in an automobile or the like.

2. Background Art

FIG. 5 shows one form of a conventional harness routing structure for a link (refer to patent document 1).

In this structure, a pair of links 41 and 42 are rotatably connected to each other, a proximal end portion of one link 41 is rotatably supported by a vehicle body 43 of an automobile by means of a shaft portion 44, a distal end portion of the other link 42 is supported freely by a slide door 45, and a wire harness 46 for power feeding is routed from the vehicle body 43 to the slide door 45 along the both links 41 and 42. The arrangement provided is such that, in conjunction with the opening and closing of the slide door 45, the one link 41 is made swingable in the longitudinal direction of the vehicle by using the shaft portion 44 as a fulcrum, while the other link 42 is made swingable with a greater angle than the one link 41 by using an intermediate shaft portion 47 as a fulcrum, to thereby follow the movement of the slide door 45.

The wire harness 46 is fixed to the links 41 and 42 by taping 48. A connector 49 at a leading end of the wire harness 46 is connected to the wire harness on the slide door side. A wire harness portion 50 led from a distal end of the other link 42 is extended and contracted in conjunction with the opening and closing of the slide door 45.

FIG. 6 shows one form of a conventional harness routing structure (refer to patent document 2).

In this structure, to effect feeding electric power to a rotary type side door 51 of an automobile, a harness protector 53 is provided in the door 51, and a wire harness 56 is bendably routed in the protector 53 from an elastic grommet 54 on a vehicle body 52 side by means of a slidable hard tube (guide member) 55 and is led out from the protector 53 into the door interior, to be thereby connected to an electrical device, an auxiliary machine, or the like When the door 51 shown in FIG. 6 is opened, the hard tube 55 is drawn out from the protector 53, the wire harness 56 is extended along a front-side inner surface 57 of the protector 53. When the door 51 is closed, the hard tube 55 enters the protector interior, and the wire harness 56 is compressed along a rear-side inner surface 58 of the protector 53, as indicated by chain lines.

FIGS. 7A and 7B show another form of a related harness routing structure for a link.

In this structure, a link 2 is pivotally supported by a vertical supporting plate 1, a harness protector 61 is provided on the supporting plate 1, and a wire harness 6 is routed from the link 2 along the protector 61.

The wire harness 6 is fixed to the link by a band 15 or the like, is fixed to a lower end-side leading-out port 62 of the protector 61 by a band 16 or the like, and swings along an upper opening 63 of the protector 61 in conjunction with the rotation of the link 2. The link 2 rotates at a large angle of 180° or thereabouts. FIG. 7A shows the state before the rotation, and FIG. 7B shows the state after the rotation.

[Patent Document 1] JP-A-2001-260770 (FIG. 1)
[Patent Document 2] JP-A-2006-117054

However, with the above-described structure of FIG. 5, there has been concern that, in conjunction with the rotation of the links 41 and 42, the wire harness 46 becomes loose at the connecting portion 47 between the both links 41 and 42 and can possibly cause interference with other members. In addition, with the above-described structure of FIG. 6, there has been concern that the hard tube (guide member) 55, which is a separate member, is required for guiding the wire harness 56 into the protector 53, so that the structure becomes complex and results in higher cost.

In addition, with the above-described structure of FIGS. 7A and 7B, an excess length (slack) of the harness at least occurs within the scope of the dimensional tolerance of the wire harness 6. Additionally, a large excess length of the harness is likely to occur in the vicinity of the shaft portion of the link 2 in conjunction with the rotation of the link 2 at a large angle of 180° or thereabouts. Hence, there has been concern that the excess length portion of the harness interferes with the link 2 and the like and can possibly cause damage or generate abnormal noise.

SUMMARY OF THE INVENTION

In view of the above-described aspects, an object of the invention is to provide a harness routing structure for a link which is capable of reliably absorbing the excess length of the wire harness with a simple structure in correspondence with the link which rotates at a large angle as in the case of FIGS. 7A and 7B, for example.

To attain the above object, in accordance with a first aspect of the invention there is provided a harness routing structure, including: a supporting portion; a link pivotally supported by the supporting portion; and a harness protector provided on the supporting portion. The harness protector includes: a harness guide portion for guiding to lead a wire harness thereto; a harness guide path, successive to the harness guide portion, along which the wire harness is routed; and a harness accommodating portion, successive to the harness guide path, for accommodating the wire harness bendably. The wire harness is led from the link to the harness protector to be routed in the harness protector. An excess length of the wire harness is absorbed into the harness accommodating portion in conjunction with rotation of the link.

Preferably, the harness guide portion has a first curved guide wall along which the wire harness is routed in a first direction before the rotation of the link, and a second curved guide wall along which the wire harness is routed in a second direction differed from the first direction after the rotation of the link.

By virtue of the above-described configuration, the wire harness is led from the link, is passed via an inlet-side harness guide portion of the harness protector and the harness guide path continuing therefrom, is accommodated in such a manner as to be capable of absorbing an excess length (bendably in the harness accommodating portion, and is led out from an exit port on the harness accommodating portion side to the outside. The harness guide portion guides the wire harness smoothly into the harness guide path without being caught, and the harness guide path supports the wire harness slidably. In conjunction with the rotation of the link, the wire harness is drawn into the harness accommodating portion while sliding on the harness guide path, and the excess length is absorbed as the wire harness is deflected or curved and undergoes expansion (enlargement) of the radius of curvature inside the harness accommodating portion. Alternatively, the wire harness is drawn out from the harness guide portion toward the link side while sliding on the harness guide path from the harness accommodating portion.

As for the harness routing structure for a link according to a second aspect of the invention, the wire harness is constantly curved to form a substantially loop-shaped bent portion in the harness accommodating portion so that a radius of the loop-shaped bent portion is expanded to absorb the excess length of the wire harness in conjunction with the rotation of the link.

By virtue of the above-described configuration, the substantially loop-shaped bent portion is routed in the harness accommodating portion of the harness protector in a loop form with leeway (loosely movably). As the substantially loop-shaped bent portion constantly tends to expand outward by the restoring force (resilient force due to rigidity) of its own, when slack (excess length) has occurred in the wire harness outside the harness protector, that excess length is immediately drawn into the harness protector and is thereby absorbed.

By virtue of the above-described configuration, an excess length produced due to the variation of the length of the wire harness is absorbed into the harness accommodating portion of the harness protector irrespective of the presence or absence of the rotation of the link and on the basis of a principle similar to that of the excess length of the harness produced in conjunction with the rotation of the link. Thus, the length of the wire harness portion which is led out from the harness protector to the link side becomes fixed irrespective of the variation of the length o the wire harness.

As for the harness routing structure for a link according to a third aspect of the invention, a spring portion is provided in the harness accommodation portion to urge the loop-shaped bent portion in a direction of expanding the radius of the loop-shaped bent portion.

By virtue of the above-described configuration, the substantially loop-shaped bent portion is constantly urged by the resiliency of the spring portion outward (in the direction of expanding the radius of curvature). Thus, when an excess length has been produced in the wire harness outside the harness protector (on the link side), the spring portion causes the substantially loop-shaped bent portion to undergo expansion of its radius of curvature, thereby absorbing the excess length of the harness speedily and reliably into the harness protector. The spring portion may be integrally resin-molded with the harness protector, or may be a metal spring separate from the harness protector.

According to the above-described configurations of the invention, since the harness protector has the harness guide portion, the harness guide path, and the harness accommodating portion, the separate guide member as in the related example of FIG. 6 becomes unnecessary, so that the structure becomes simplified and is made low in cost and lightweight. In addition, since the excess length of the wire harness is absorbed into the protector during the rotation of the link, the concern over the excess length of the harness interfering with other members and causing damage or generating abnormal noise can be overcome, and the reliability of electric power feeding by the wire harness is enhanced.

According to the above-described configurations of the invention, since the substantially loop-shaped bent portion of the wire harness undergoes enlargement of its radius of curvature inside the harness protector and absorbs the excess length of the harness in the outside, the interference of the excess length of the harness in the first aspect of the invention is reliably prevented.

According to the above-described configurations of the invention, the dimensional tolerance of the overall length of the wire harness is absorbed into the harness protector as an excess length of the harness, and the length of the wire harness portion outside the harness protector becomes fixed irrespective of the dimensional tolerance, thereby overcoming the problems of the interference, appearance, and the like due to the excess length.

According to the above-described configurations of the invention, the substantially loop-shaped bent portion is made to undergo enlargement of its radius of curvature by the resiliency of the spring portion, thereby reliably absorbing into the harness protector the excess length of the harness outside the harness protector. In addition, as the spring portion is constantly in pressing contact with the inner surface of the substantially loop-shaped bent portion of the wire harness, there are no possibilities of unwanted free movement of the bent portion as well as abnormal noise, wear, and the like accompanying the same inside the harness protector.

BRIEF DESCRIPTION OF THE DRAWINGS

The above objects and advantages of the present invention will become more apparent by describing in detail preferred exemplary embodiments thereof with reference to the accompanying drawings, wherein like reference numerals designate like or corresponding parts throughout the several views, and wherein:

FIGS. 1A and 1B illustrate a first embodiment of a harness routing structure for a link in accordance with the invention, in which FIG. 1A is a front elevational view of a state before the rotation of a link, and FIG. 1B is a front elevational view of a state after the rotation of the link;

FIGS. 2A and 2B illustrate a protector which is similarly used in the harness routing structure for a link, in which FIG. 2A is a front elevational view of a case in which the line length of a wire harness is short, and FIG. 2B is a front elevational view of a case in which the line length of the wire harness is long;

FIGS. 3A and 3B illustrate a second embodiment of the harness routing structure for a link in accordance with the invention, in which FIG. 3A is a front elevational view of a state before the rotation of the link, and FIG. 3B is a front elevational view of a state after the rotation of the link;

FIGS. 4A and 4B illustrate a third embodiment of the harness routing structure for a link in accordance with the invention, in which FIG. 4A is a front elevational view of a state before the rotation of a link, and FIG. 1B is a front elevational view of a state after the rotation of the link;

FIGS. 7A and 7B illustrate another form of a related harness routing structure for a link, in which FIG. 7A is a front elevational view of a state before the rotation of a link, and FIG. 1B is a front elevational view of a state after the rotation of the link.

DETAILED DESCRIPTION OF THE PREFERRED EMBODIMENTS

Figure 1A:
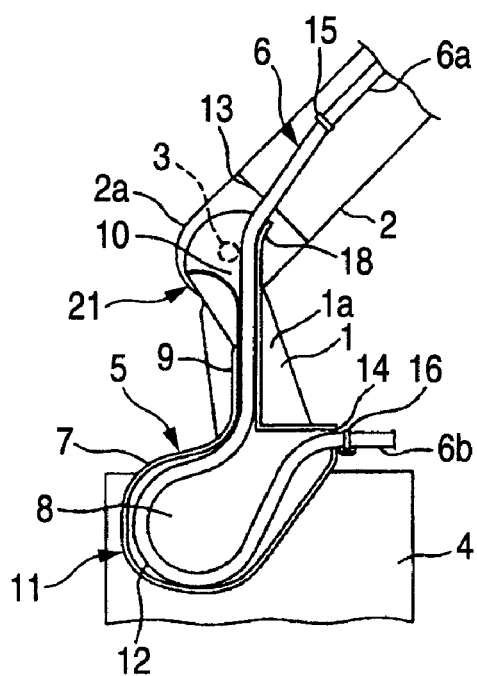
Figure 1B:
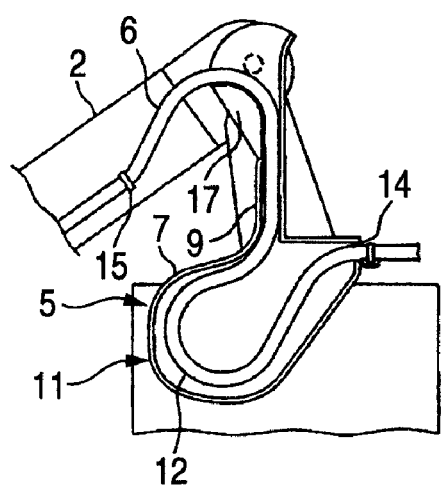
Figure 7A:
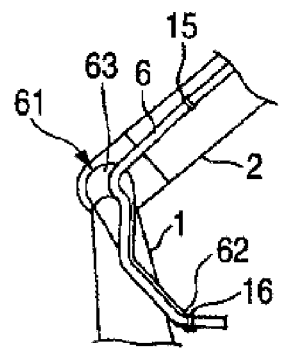
Figure 7B:
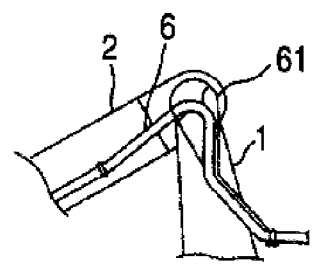

FIGS. 1A and 1B illustrate a first embodiment of a harness routing structure for a link in accordance with the invention. A description will be given by denoting those component parts that are similar to those of FIGS. 7A and 7B by the same reference numerals.

In this structure, a link 2 is rotatably connected to a vertical supporting plate (supporting portion) 1 on a fixing side by means of a shaft portion 3, a harness protector 5 is vertically disposed in such a manner as to extend alongside both the supporting plate 1 and a base portion 4 continuing from a lower side of the supporting plate 1, and a wire harness 6 is led from the link 2 side toward the base portion 4 side via the protector 5. In this structure, the protector 5 has a harness accommodating space 8 provided on a lower half side and surrounded by a substantially annular peripheral wall 7; an upwardly extending narrow guide path 9 provided on an upper half side and communicating with the accommodating space 8; and a harness leading-out port 10 continuing from an upper end side of the guide path 9 and having its width expanded in a substantially flared form.

In addition, as the wire harness 6 is bent substantially in a loop form (a form close to an annular shape and is accommodated in a harness accommodating portion 11 having a substantially annular outer shape and including the harness accommodating space 8, a resilient force acting in the direction of enlarging the radius of curvature is generated in a substantially loop-shaped harness portion (bent portion) 12, to thereby allow an excess-length portion of the wire harness 6 to be drawn into the protector 5 by the resilient force of the wire harness itself.

The protector 5 is composed of a synthetic resin-made protector body or protector base (reference numeral 5 is also used for it) and a cover (not shown), and the cover is fixed to the protector body (5) by a retaining means (not shown). The supporting plate 1 and the link 2 are formed of a metal or a synthetic resin. The supporting plate 1 may be called a fixing link or a bracket, and the link 2 may be called a movable link or a rotary link.

The base portion 4 is flush with the supporting plate 1 and continues therefrom as an integral or separate unit. A proximal end portion 2a of the link 2 is brought into sliding contact with a surface of the supporting plate 1 opposite to its protector joining surface (fixing surface) 1a rotatably about the shaft portion 3. The proximal end portion 2a and a longitudinally intermediate portion of the link 2 continue with each other via a stepped portion 13. The intermediate portion of the link is located flush with the projector joining surface. The wire harness 6 is routed in a substantially flush plane in a range covering the protector 5 and the link 2.

The wire harness 6 is fixed to the intermediate portion of the link 2 and to a vicinity of a harness leading-out port 14 on the harness accommodating portion 11 side of the protector 5 by banding members (harness fixing portions) 15 and 16 such as bands and tapes. If necessary, a protector (not shown) may be provided on the link 2 side as well, and the wire harness 6 may be inserted and fixed in that protector. The shaft portion 3 is provided in the supporting plate 1 in such a manner as to project horizontally to be passed through and support the link 2 without interfering, for instance, the protector 5.

Figure 2A:
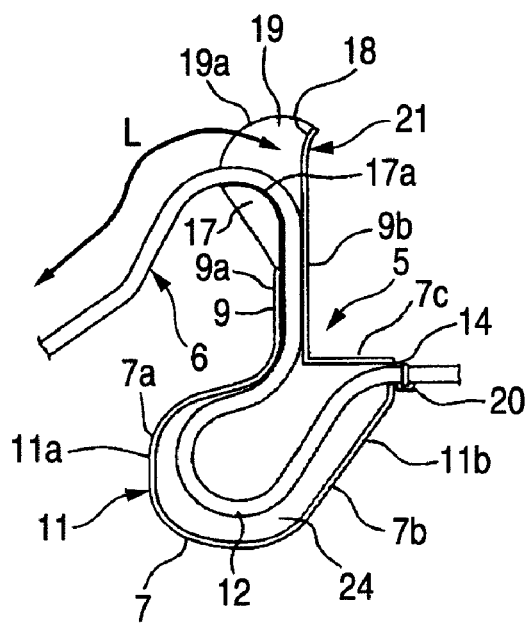
Figure 2B:
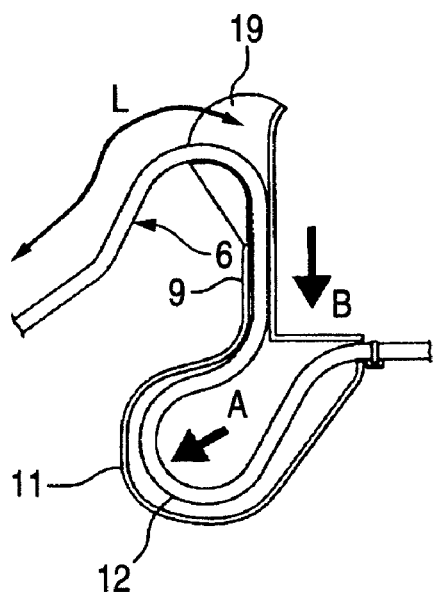

As also shown in FIGS. 2A and 2B, the harness accommodating portion 11 of the protector 5 is composed of a substantially semicircular left half portion 11a and a substantially triangular right half portion 11b. A curved wall portion 7a on the left half side integrally continues to a right-upwardly slanting tilted wall portion 7b on the right half side, and the tilted wall portion 7b integrally continues to a horizontal wall portion 7c on the upper side, to hence form the peripheral wall 7. The wall portion 7c on the upper side and the curved wall portion 7a on the left half side integrally continue to a cylindrical or rectangular tube-shaped wall portion (reference numeral 9 is also used for it) which forms the harness guide path 9. The peripheral wall 7 is formed in the periphery of a vertical wall portion (base board portion) 24 on the reverse surface side contiguous to the base portion 4 (FIG. 1A).

A guide wall 17 having a circular arc-shaped or curved guide surface with a small radius of curvature integrally continues from an upper portion of a left-side wall portion 9a of the harness guide path 9, while a guide wall (reference numeral 18 is also used for it) having a curved guide surface 18 with a large radius of curvature is integrally formed on an upper portion of a right-side wall portion 9b of the guide path 9. The right-side guide wall 18 protrudes more upward than the left-side guide wall 17, and the both guide walls 17 and 18 are connected to each other by a substantially fan-shaped rear surface-side wall portion 19 having a circular arc-shaped upper end 19a. The wall portion 19 is located flush with the wall portion 24 on the lower half side.

The narrow port 14 for leading out the harness is provided along the upper right wall portion 7c of the harness accommodating portion 11, and a frame portion (harness fixing portion) 20 for inserting a band is integrally provided in the vicinity of the port 14. The harness accommodating portion 11 on the lower half side protrudes (bulges) more to the left and right than a harness guide portion 21 constituted by the upper half guide walls 17 and 18. It should be noted that, in this specification, the "left and right" directions are for the sake of explanation, and do not necessarily coincide with the direction in which the protector 5 is mounted in a vehicle or the like. In addition, the shape of the protector 5 is changeable, as required, in correspondence with the shape of the protector 5 as well as the shapes of the supporting plate 1, the base portion 4, and the like.

FIG. 1A shows a state before the rotation of the link, and FIG. 1B shows a state after the rotation of the link when the link 2 is rotated counterclockwise from the state shown in FIG. 1A.

In FIG. 1A, the link 2 is positioned in such a manner as to be tilted rightwardly upward, and the wire harness 6 is routed rectilinearly from the harness fixing portion 15 of the link 2 toward the curved guide wall 18 on the right side, and is then routed rectilinearly downward from the guide wall 18 along the harness guide path 9. The wire harness 6 is then curved substantially in a loop form from a lower end of the guide path 9 along the inner surface side of the peripheral wall 7 of the harness accommodating portion 11, and is led from the right-side port 14 to the outside.

As the wire harness 6 bulges outward substantially in the loop form inside the harness accommodating portion 11 by the restoring force due to its own rigidity, an excess length of the harness is absorbed (drawn) into the accommodating portion 11, and the wire harness 6 is routed without slack between the guide wall 18 of the protector 5 and the harness fixing portion 15 of the link 2. Since the excess length of the harness is not produced, it is possible to prevent the bending of the wire harness 6 and the interference with the link 2 and the like due to the excess length of the harness.

In FIG. 1B, the link 2 is positioned in such a manner as to be tilted leftwardly downward, and the wire harness 6 is routed in an upwardly curved form from the harness fixing portion 15 of the link 2 toward the curved guide wall 17 on the left side, and is then routed rectilinearly downward from the guide wall 17 along the harness guide path 9. The wire harness 6 is then curved substantially in a loop form from the lower end of the guide path 9 along the peripheral wall 7 of the harness accommodating portion 11, and is led from the right-side port 14 to the outside.

In conjunction with the rotation of the link 2, the wire harness 6 is slid upward on the guide path 9 and is drawn out from the guide wall 17, so that the radius of curvature of the loop-shaped harness portion (bent portion) 12 is slightly smaller than that of the state shown in FIG. 1A. As the wire harness 6 bulges outward substantially in the loop form inside the accommodating portion 11 by the restoring force due to its own rigidity, the excess length of the harness is absorbed (drawn) into the accommodating portion 11, and the wire harness 6 is routed in a smooth curved shape without slack between the guide wall 17 of the protector 5 and the harness fixing portion 15 of the link 2. Since the excess length of the harness is not produced, it is possible to prevent the bending of the wire harness 6 and the interference with the link 2 and the like due to the excess length of the harness.

Even at an intermediate position between FIG. 1A and FIG. 1B, i.e., in a state in which the link 2 is positioned at a leftwardly upward halfway in the rotation of the link 2, in the same way as described above, the wire harness 6 bulges outward (undergoes enlargement of its radius of curvature) substantially in the loop form inside the accommodating portion 11 by the restoring force due to its own rigidity, so that the excess length of the harness is absorbed (drawn) into the accommodating portion 11, and the wire harness 6 is routed without slack between the upper end of the harness guide path 9 of the protector 5 and the harness fixing portion 15 of the link 2. Since the excess length of the harness is not produced, it is possible to prevent the bending of the wire harness 6 and the interference with the link 2 and the like due to the excess length of the harness. As the link 2 is rotated from the state shown in FIG. 1B to the state shown in FIG. 1A, the wire harness 6 is lid downward on the guide path 9, and is drawn into the accommodating portion 11.

FIG. 2A shows a state in which the line length of the wire harness 6 is short, and FIG. 2B shows a state in which the line length of the wire harness 6 is long (the relative length of the line length inevitably occurs at least within the scope of the dimensional tolerance of the wire harness). The position of the link 2 corresponds to that in FIG. 1B.

In the case where the line length is long in FIG. 2B, an excess length can possibly be produced from the guide portion 21 of the protector 5 toward the outside, but since the wire harness 6 undergoes enlargement of its radius of curvature in a loop form within the accommodating portion 11, as shown by arrow A, the excess length of the harness is absorbed while the wire harness 6 slides downward along the guide path 9, as shown by arrow B. Therefore, the length of the harness portion L from the guide portion 21 to the outside becomes identical. Since the excess length of the harness is not produced, it is possible to prevent the bending of the wire harness 6 and the interference with the link 2 and the like due to the excess length of the harness.

Figure 3A:
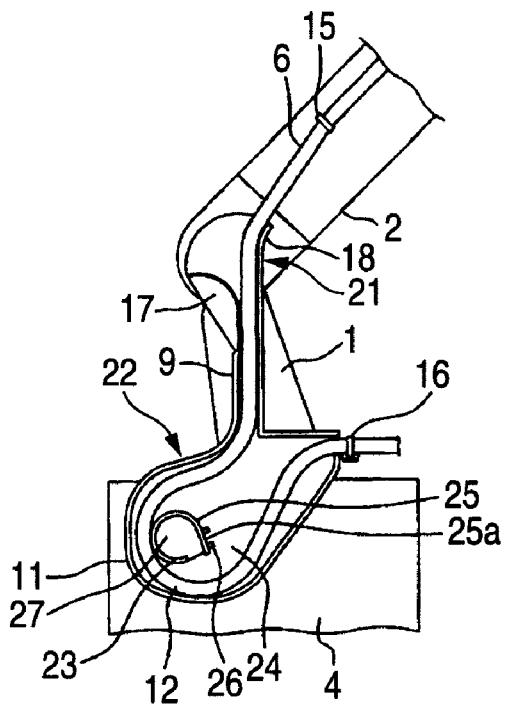
Figure 3B:
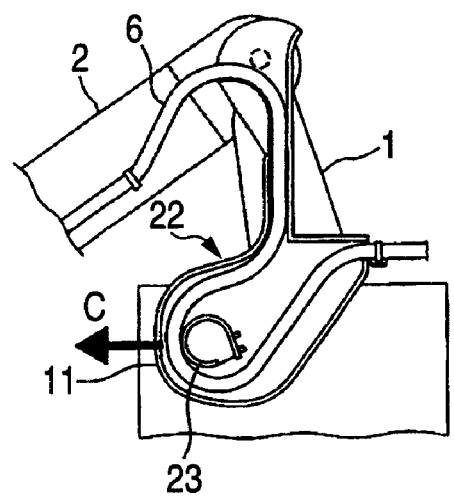

FIGS. 3A and 3B show a second embodiment of the harness routing structure for a link. This structure is characterized by providing a harness urging spring portion 23 inside the harness accommodating portion 11 of a harness protector 22. Since the other configuration portions are similar to those of the embodiment shown in FIGS. 1A and 1B, those component parts that are similar to those of FIGS. 1A and 1B will be denoted by the same reference numerals, and a description thereof will be omitted.

The spring portion 23 is arranged such that a substantially annular (not completely annular) wall portion 25 is integrally formed projectingly on a wall portion (vertical base board portion) 24 on the rear surface side of the accommodating portion 11 of the protector 22, and at least a distal end-side half portion (preferably, a portion excluding a proximal end side 25a) of the substantially annular wall portion 25 is cut out from the rear surface-side wall portion 24 by vertical slits (not shown), so as to be formed into the shape of leaf spring. The proximal end portion 25a of the substantially annular wall portion 25 is preferably reinforced by a rib 26 with respect to the rear surface-side wall portion 24. In this example, a hole 27 is provided in the wall portion 24 on the inner side of the substantially annular spring portion 23.

The spring portion 23 resiliently urges an intermediate portion of the substantially loop-shaped bent portion 12 of the wire harness 6 so as to push and enlarge that intermediate portion outward, as shown by arrow C. As a result, before the link rotation in FIG. 3A, after the link rotation in FIG. 3B, and in the course of link rotation intermediate therebetween, the wire harness 6 is constantly spring-urged in a direction in which it is drawn into the accommodating portion 22, thereby reliably absorbing the excess length of the harness outside the protector. In addition, as the spring portion 23 is constantly in pressing contact with the inner surface of the substantially loop-shaped bent portion 12, there are no possibilities of unwanted free movement of the bent portion 12 as well as abnormal noise, wear, and the like accompanying the same.

It should be noted that, instead of the spring portion 23 of the protector body, it is possible to use as the spring portion a resilient member such as a metallic leaf spring separate from the protector 22. In that case, however, the cost increases as compared with the case where the spring portion 23 is integrally resin-molded on the protector 22, and a structure for fixing the spring portion 23 to the protector 22 is also required, which results in the complexity of the structure and an increase in the number of steps of fixing operation.

Figure 4A:
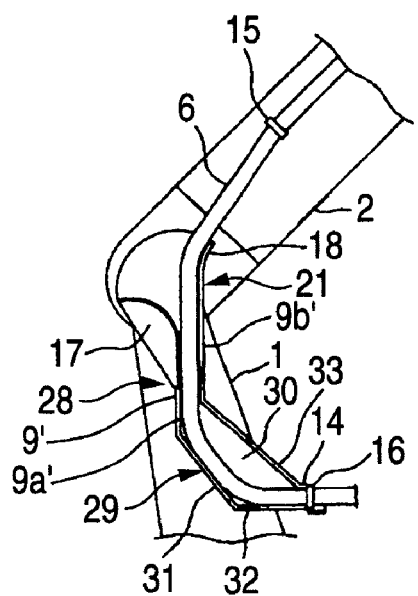
Figure 4B:
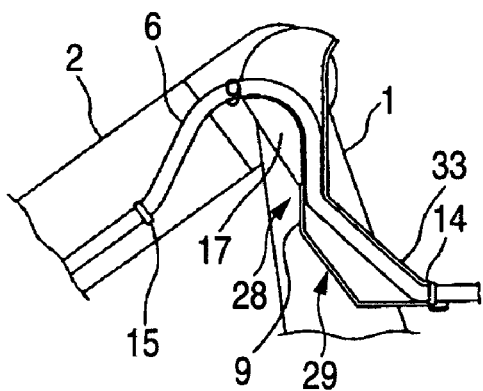
Figure 5:
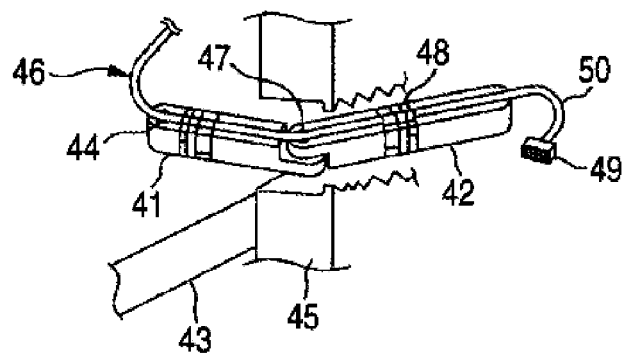
FIG. 5 is a perspective view illustrating a related harness routing structure for a link.
Figure 6:
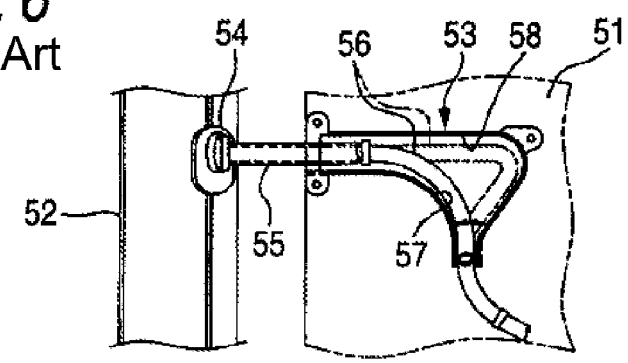
FIG. 6 is a front elevational view illustrating one form of a related harness routing structure.

FIGS. 4A and 4B show a protector structure in a case where the amount of absorption of the excess length of the harness can be small in accordance with a third embodiment of the harness routing structure for a link. Since the structure of the guide portion 21, the link 2, and the supporting plate 1 on the upper half side of a harness protector 28 are similar to those of the first embodiment, similar component parts will be denoted by the same reference numerals, and a description thereof will be omitted.

In this protector 28, the harness guide portion 21 is integrally formed in the upper half, a harness guide path 9', which continues from the harness guide portion 21 and is shorter than the guide path in the example of FIG. 1A, is integrally formed intermediately, and a substantially trapezoidal harness accommodating portion 29 of a size equivalent to the guide portion 21 is integrally formed in a lower half. The accommodating portion 29 is made compact to a size which is half the accommodating portion 11 of the example of FIG. 1 or smaller.

A lower half portion of a vertical left-side wall portion 9a' of the guide path 9' forms a portion of the wall portion of the accommodating portion 29, a lower half portion of the wall portion 9a' continues to a right-downwardly tilted wall portion 31, and the tilted wall portion 31 continues to a horizontal wall portion 32 on the bottom side. Further, the harness leading-out port 14 and the harness fixing portion 16 are provided on the right end side of the bottom-side wall portion 32, the port 14 continues to a left-upwardly tilted wall portion 33, and the tilted wall portion 33 continues at an angle to a vertical right-side wall portion 9b' of the guide path 9'. The accommodating portion 29 is thus formed which constitutes a polygonal harness accommodating space 30 by being surrounded by the respective wall portions 9a' and 31 to 33 and by a vertical wall portion (reference numeral 30 is used for it) on the rear surface side. The wall portions 9a' and 9b' may not necessarily be vertical, and the wall portions 9a', 9b', and 31 to 33 may be formed not rectilinearly but in a curved form. It goes without saying that the protector 28 includes the cover (not shown) which covers the accommodating space 30.

FIG. 4A shows a state before the rotation of the link, and FIG. 4B shows a state after the rotation of the link when the link 2 is rotated counterclockwise from the state shown in FIG. 4A.

In FIG. 4A, the link 2 is positioned in such a manner as to be tilted rightwardly upward, and the wire harness 6 is led from the harness fixing portion 15 of the link 2 without slack via the guide wall 18 and the guide path 9', is then routed in a curved manner along the left-side tilted wall portion 31 of the accommodating portion 29, and is led from the right-end port 14 to the outside.

In FIG. 4B, the link 2 is positioned in such a manner as to be tilted leftwardly downward, and the wire harness 6 is led from the harness fixing portion 15 of the link 2 in a rightwardly upward direction via the left-side guide wall 17 and the guide path 9' while being curved substantially in an inverse U-shape, is then routed straightly along the right-side tilted wall portion 33 of the accommodating portion 29, and is led from the right-end port 14 to the outside. At an intermediate position between FIG. 4A and FIG. 4B, i.e., halfway in the rotation of the link 2, the wire harness 6 is positioned substantially in the center of the accommodating portion 29 inside the accommodating portion 29 without coming into contact with the left and right tilted wall portions 31 and 33.

In the state shown in FIG. 4B, the wire harness 6 is drawn out from the protector 29 toward the link 2 side and is curved substantially in the inverse U-shape, whereas, in the state shown in FIG. 4A, the wire harness 6 is drawn into the protector 29. Since the excess length of the harness is small, the excess length can be absorbed by merely allowing the wire harness 6 to be deflected in the curved form inside the accommodating portion 29.

As one example of application of each of the above-described harness routing structures, the supporting plate 1 shown in FIGS. 1A and 1B is disposed in an upwardly oriented manner in a rear portion of a vehicle body in correspondence with a vertically rotatable type back door of an automobile, for example. A wire harness portion 6b led out from the lower port 14 of the protector 5 is routed and connected to the vehicle body (power supply side), and a wire harness portion 6a on the link side is routed on the back door side. When the back door is fully closed, as shown in FIG. 1B, the link 2 is positioned in a manner as to be oriented diagonally downward toward the rear side of the vehicle. When the back door is fully open, as shown in FIG. 1A, the link 2 is positioned in a manner as to be oriented diagonally upward toward the front side of the vehicle. The supporting plate 1 and the base portion 4 may be portions of the vehicle body.

As another example of application, the above-described harness routing structure can also be applied, for example, as a structure for opening and closing a roof of an automobile or for effecting the accommodation of a roof into a luggage space in the rear portion of the vehicle. Still alternatively, it is also possible to cope with the opening and closing of a slide door or a side door by disposing the supporting plate 1 not vertically but horizontally.

The wire harness 6 is generally composed of a plurality of electric wires and harness protecting tubes (corrugated tubes, net-like tubes, etc.) covering them. In particular, if a corrugated tube alternately having circumferential recessed grooves and projections is used, it is possible to enhance the function of enlarging the radius of curvature of the wire harness 6 inside the accommodating portion 11 of the protector 5, i.e., the excess length absorbing function. As the wire harness 6, it is also possible to use a plurality of electric wires by partially winding them by tapes, bands, or the like.

The wire harness 6 is accommodated in advance within the protector 5, and in that state the protector 5 is fixed to the supporting plate 1 and the base portion 4 by a fixing means such as retaining clips, bolting, or the like. The protector 5 is preferably constructed in a split fashion (openably) by the protector base (reference numeral 5 is also used for it) and the cover in the light of enhancing the efficiency of inserting (accommodating) operation of the wire harness 6.

The above-described configurations shown in FIGS. 1A to 4B are also effective as a protector structure for a link, a harness excess-length absorbing structure, an electric power feeding structure, and the like, apart from the harness routing structure for a link. The link 2 and the supporting plate 1, together with the protector 5, can also be formed into a unit as an electric power feeder.

What is claimed is:

1. A harness routing structure, comprising:
    a supporting portion having a first fixing portion for fixing a wire harness, the supporting portion having a shaft portion;
    a link pivotally supported by the supporting portion at the shaft portion, the link having a second fixing portion for fixing the wire harness; and
    a harness protector provided on the supporting portion;
    wherein the harness protector includes:
        a harness guide portion for guiding to lead the wire harness to a harness guide path from the second fixing portion;
        the harness guide path, successive to the harness guide portion, along which the wire harness is routed; and
        a harness accommodating portion, successive to the harness guide path, for accommodating the wire harness bendably,
    wherein the wire harness is led from the link to the harness protector to be routed in the harness protector, and
    wherein an excess length of the wire harness is absorbed into the harness accommodating portion in conjunction with rotation of the link.

2. The harness routing structure according to claim 1, wherein the wire harness is constantly curved to form a substantially loop-shaped bent portion in the harness accommodating portion so that a radius of the loop-shaped bent portion is expanded to absorb the excess length of the wire harness in conjunction with the rotation of the link.

3. The harness routing structure according to claim 2, wherein a spring portion is provided in the harness accommodation portion to urge the loop-shaped bent portion in a direction of expanding the radius of the loop-shaped bent portion.

4. The harness routing structure according to claim 1, wherein the harness guide portion has a first curved guide wall along which the wire harness is routed in a first direction before the rotation of the link, and a second curved guide wall along which the wire harness is routed in a second direction differed from the first direction after the rotation of the link.

5. The harness routing structure according to claim 1, wherein the harness accommodating portion includes a peripheral wall and the wire harness is expanded toward the peripheral wall in conjunction with the rotation of the link.

6. The harness routing structure according to claim 4, wherein the harness accommodating portion includes a peripheral wall and the wire harness is expanded toward the peripheral wall in conjunction with the rotation of the link.

* * * * *